March 14, 1939.  F. GRAY  2,150,159
ELECTRO-OPTICAL SYSTEM
Filed March 4, 1936   2 Sheets-Sheet 2
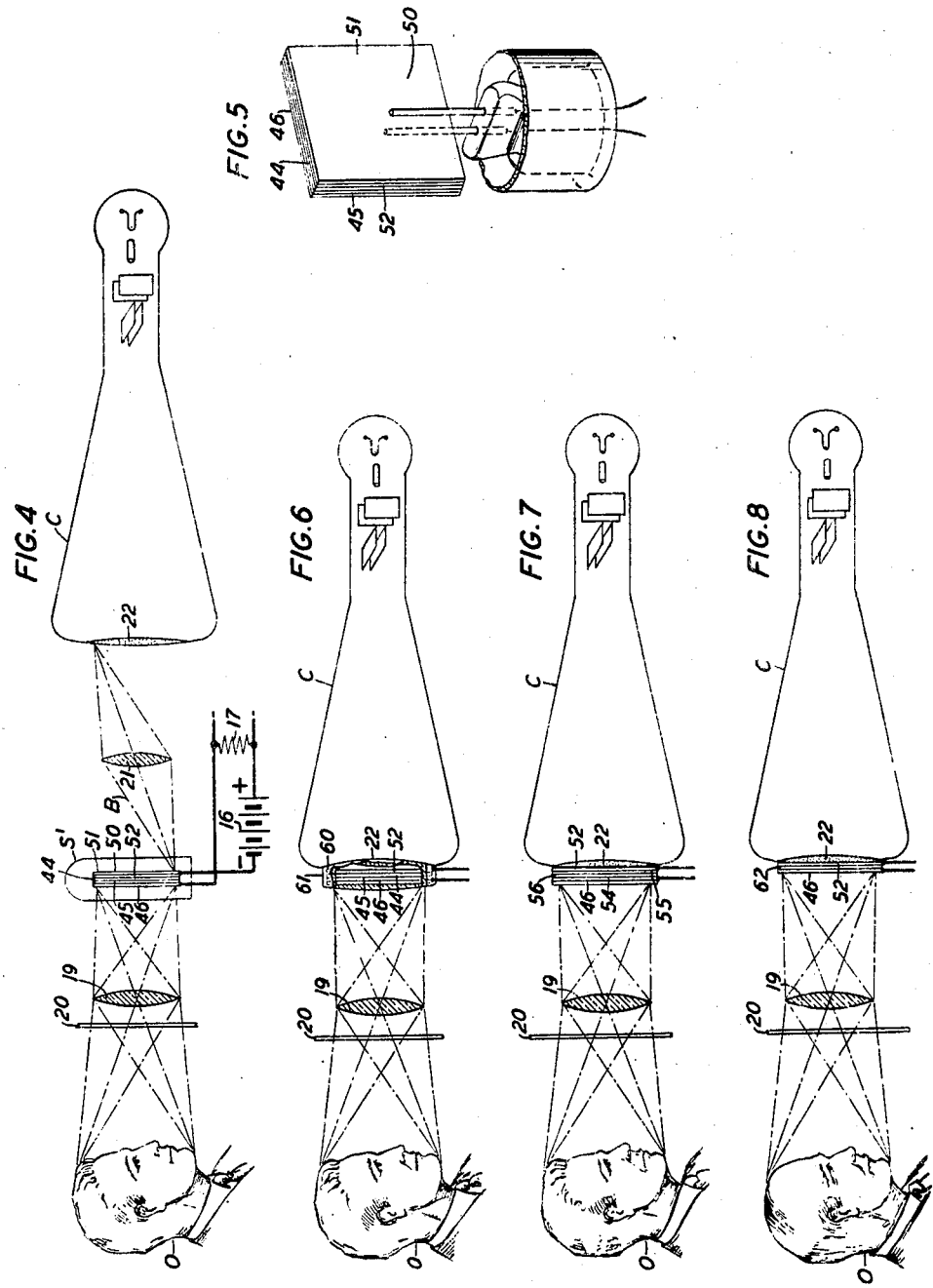
INVENTOR
F. GRAY
BY
*Chas. S. Sprague*
ATTORNEY Patented Mar. 14, 1939

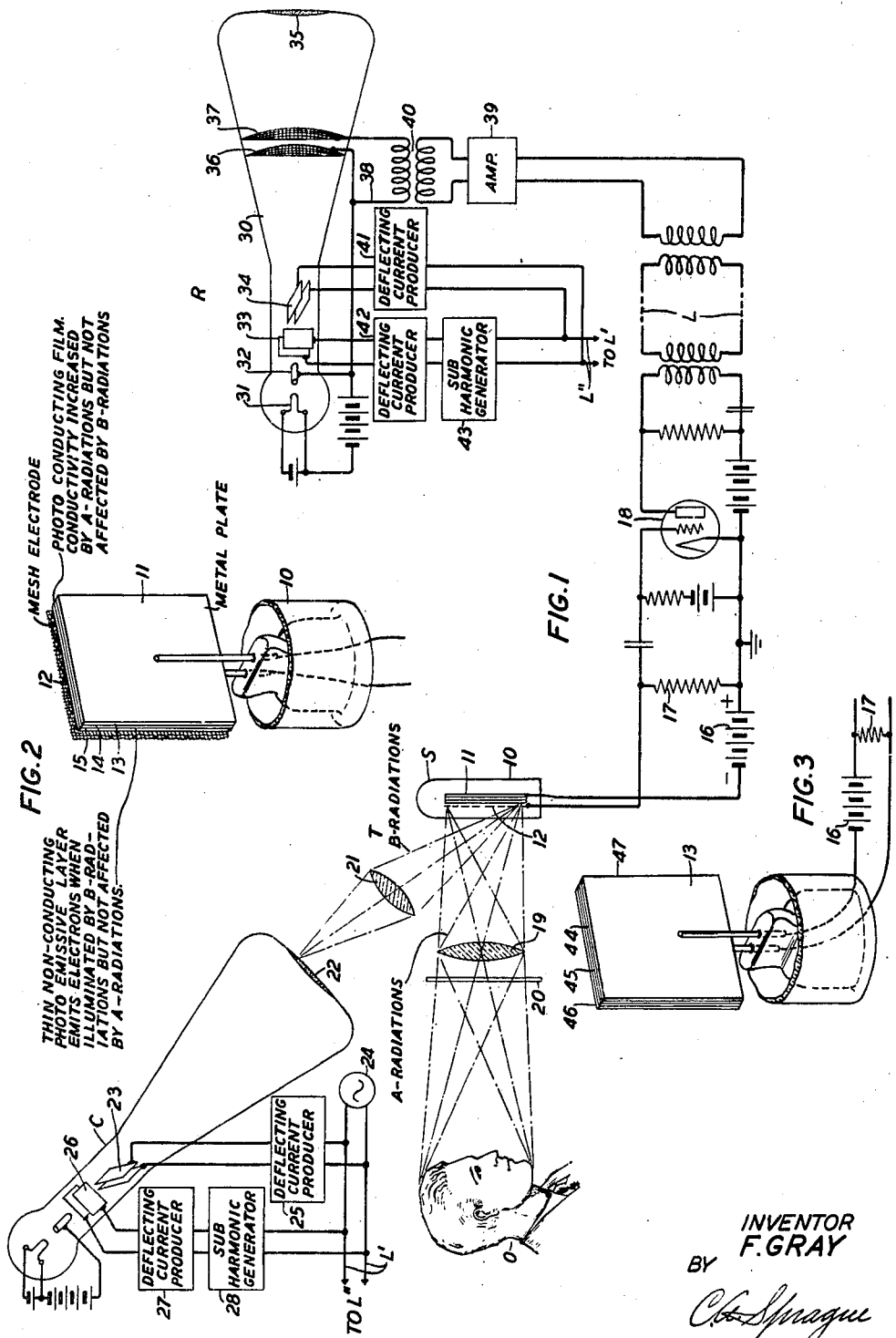

2,150,159

UNITED STATES PATENT OFFICE 2,150,159

ELECTRO-OPTICAL SYSTEM

Frank Gray, New York, N. Y., assignor to Bell Telephone Laboratories, Incorporated, New York, N. Y., a corporation of New York Application March 4, 1936, Serial No. 67,059

4 Claims. (Cl. 178—7.2)

This invention relates to electro-optical systems and more particularly to a method of and means for setting up electric currents representative of the various light-tone values of an object, as in television scanning.

Certain light sensitive electric materials have a large response to light of wave-lengths within a certain range and zero or negligibly small response in another range or ranges. It has been discovered that this phenomenon can be put to use in electro-optical systems, as for example, television transmission systems, so that a light-sensitive electric image receiving plate or layer may be associated with a second light-sensitive electric layer adapted to be scanned by a beam of light to produce image currents dependent upon the light intensities of the elemental areas of the image plate, the material of one or both layers being chosen with regard to the wave-length range of sensitivity, and the wave-lengths of either the scanning beam or the image light beam, or both, also being chosen so that one or the other of these beams may pass through one layer to the other without affecting it, or each beam may impinge upon both layers while affecting only one, or each beam may impinge upon a different layer, thus each beam affecting only one.

An object of this invention is to provide methods of and apparatus for utilizing the phenomenon mentioned above in the production of electric currents under control of light.

Another object is to provide novel means for producing image currents for use in systems of television and telephotography.

A further object of this invention is to provide scanning apparatus which, while not utilizing the phenomenon mentioned above, provides means for making each film or layer responsive to a different beam of light.

In accordance with one embodiment of the invention, chosen for purposes of illustration and hereinafter described in detail, a gas-tight container encloses a target, comprising a metallic plate carrying a photo-conducting film, i. e., a film formed of material adapted to have its conductivity increased when supplied with radiations of one wave-length range, on which is applied a very thin film or coating of a non-conducting photo-emissive material adapted to emit electrons when exposed to radiations of a second wave-length range which radiations, however, do not affect the conductivity of the photo-conducting film, and a fine mesh electrode adjacent the coating of photo-emissive material. Associated with the container are means for applying radiations of the first wave-length range to an object and for directing radiations reflected from the object, through the interstices of the mesh electrode and the photo-emissive layer, upon the photo-conducting film to control its conductivity. Also associated with the container are means for producing a moving beam of radiations of the second wave-length range and for causing it to pass through the interstices of the electrode to scan successively the elemental areas of the photo-emissive coating, which is thereby activated to cause the production of a moving beam of electrons which passes to the mesh electrode, to thereby cause a flow of image current to an external circuit. The flow of photo-electrons from an elemental area of the photo-emissive coating is controlled by the conductivity imparted to successive elemental areas of the underlying photo-conducting layer by radiations corresponding to the lights and shades of the object.

As an alternative, radiations reflected from the object may be applied to the photo-emissive coating from a wave-length range which cause it to emit electrons but which do not affect the conductivity of the photo-conducting film and an image current may be produced by scanning the photo-conducting film with a beam of radiations which renders its elemental areas conductive in turn but which does not cause the photo-emissive coating to emit electrons.

In another embodiment, the target may comprise a metal plate, a pair of photo-conducting films of materials respectively sensitive to different wave-length ranges of radiations, and a transparent conductive layer. Radiations of one range reflected from the object control the conductivity of the elemental areas of one of the films in accordance with the light-tone values of the corresponding elemental areas of the object while a beam of radiations of a second wave-length range scans in succession the elemental areas of the second film through the transparent layer and the first film to successively render these elemental areas conducting. The external circuit is connected to the metal plate and the transparent conductive layer, so that when the elemental areas of both films are made conducting by the radiations projected on them respectively, an image current which varies with the tone values of the object passes through this external circuit.

As an alternative to this embodiment, the target may comprise a transparent plate provided with a transparent metal coating carrying two superposed films of photo-conducting material, and a transparent conducting layer, the image controlled radiations being applied to one film from a position in front of the target to control the conductivity applied to its respective unit areas, as described above, while the scanning beam of radiations of a different wave-length range is directed through the transparent plate to the other film from a position behind the target. The external circuit is connected between the metal coating and the conducting layer and an image current is supplied to that circuit in a manner similar to that described above. The target may be applied to the external surface of the end wall of a cathode ray tube, i. e., the wall carrying the fluorescent screen, and radiations from the fluorescent spot may be used to effect scanning. Again, the target may comprise two photo-conducting films of the same material separated by an intervening black, high resistance layer, which prevents the scanning spot from affecting the photo-conducting film to which the image controlled radiations are applied. As a further alternative, a single film of photo-conducting material may be used, provided it is just thick enough to prevent the scanning spot and the radiations controlled by the object from affecting it throughout. In either of the two last-mentioned alternatives, radiations of the same type may be used both for illuminating the object and for scanning the target.

If the photo-conducting layers in any of the above embodiments are made of a material having high specific resistance and are made relatively thin compared to the size of the area covered by the scanning light beam, they may be made continuous as the lateral conductivity therethrough be so small as to be negligible. The thin film and the high specific resistance help to produce a large stored charge which is discharged by the scanning beam.

The invention will be more readily understood by referring to the following description, taken in connection with the accompanying drawings forming a part thereof, in which:

Fig. 1 is a diagrammatic representation of a television system including the invention;

Fig. 2 is an enlarged perspective view of the assembly used in the scanning tube of Fig. 1;

Fig. 3 is an enlarged perspective view of a type of assembly that may be used as an alternative to that shown in Fig. 2;

Fig. 4 shows a system somewhat similar to that of Fig. 1 embodying a modified method of scanning;

Fig. 5 is an enlarged perspective view of the assembly used in the scanning tube of Fig. 4;

Fig. 6 shows an image target mounted on the end of a cathode ray tube; and

Figs. 7 and 8 are modifications of Fig. 6.

Referring more particularly to the drawings, Fig. 1 shows a television system which, in general, comprises a television transmitter T connected by a transmission channel L to a television receiver, R.

The transmitter T includes a scanning tube S, an optical system for gathering radiations of one type, reflected from an object O, and for directing these radiations to a target included in the scanning tube, and means, such as the cathode ray tube C, for producing a moving beam of radiations of a second type and, in cooperation with a suitable optical system, for causing this beam to scan the target. Scanning tube S comprises a gas-tight container 10 of glass or other suitable material enclosing an image target or screen, represented generally as 11, and a fine mesh electrode 12 spaced therefrom.

In order to clarify the detailed description of the system of Fig. 1, reference will now be made to Fig. 2, which illustrates an enlarged perspective view of the assembly used in the scanning tube S, with the glass container broken away. As therein shown, the assembly comprises a suitable anode, such as the mesh electrode 12 and a target or screen 11 comprising in order (starting from the side away from the electrode 12): a metal plate 13 carrying a photo-conducting film 14 which in turn carries a coating 15 of photo-emissive material. The conductivity of the photo-conducting film 14 increases when supplied with radiations of one wave-length range, which for convenience will be hereinafter designated A-radiations, while the photo-emissive coating 15 is sensitive to a second wave-length range of radiations, hereinafter designated B-radiations, which do not affect the conductivity of the film 14.

The fine mesh electrode 12 is adjacent the photo-emissive coating 15 and is connected to the metal plate 13 by an external circuit, including a battery 16 and a resistance 17, the latter being included in the input circuit of an amplifier 18. The negative terminal of the battery 16 is connected to the metal plate 13 and the battery's positive terminal is connected to the mesh electrode 12 through the resistance 17, whereby this electrode is polarized to operate as an anode with respect to the plate 13.

The object or field of view O is supplied with radiations from a suitable source, not shown, and these radiations are reflected from the object through an optical system, represented generally by a lens 19, through the interstices of the mesh electrode 12 and through the thin coating 15 onto the photo-conducting film 14 where an image of the object O in A-radiations is formed. The small areas of the film 14 are thereby successively rendered conducting in accordance with the tone values of the corresponding small areas of the image field O. A suitable optical filter 20 may be inserted between the object O and the lens 19 in order to pass only the type of radiations desired.

Also associated with the scanning device S is a second optical system represented by a means for generating a moving spot of light, and a lens system, represented generally by a lens 21, for forming a moving beam of radiations to scan the surface of the photo-emissive coating 15. The means for generating the moving spot of light is represented and will be described below as a cathode ray tube C having a fluorescent screen 22, but any other suitable type of apparatus for producing this result may be used, as for example, a source of radiations associated with a disc having a series of apertures arranged in a spiral.

The cathode beam of the tube C is deflected in two directions at right-angles to each other and at such relative speeds in the two directions that the screen 22 is excited to fluorescence to produce a moving spot of radiations which covers the entire screen in a time interval within the period of persistence of vision, in order to prevent flicker. Deflection of the beam in one direction is effected by the field between a pair of deflecting plates 23 supplied with current having a saw-toothed wave form, the production of this current eing controlled by oscillations of line scanning requency supplied by the oscillator 24 to the eflecting-current producing device 25. Deflection in the other direction is produced by suplying a second pair of deflecting plates 26 with current, also of saw-tooth wave form, supplied y the deflecting-current producing device 27, ontrolled by oscillations of image cycle frequency roduced by a sub-harmonic generator 28 suplied with oscillations from the oscillator 24. Any uitable apparatus, such as that disclosed in Jnited States Patent 1,613,954, January 11, 1927, o Knoop, may be used to produce the deflecting urrents.

The operation of the scanning tube S is as ollows:

A-radiations from a suitable source (not hown) are reflected by the object O and proected through the interstices of the mesh elecrode 12 and the photo-emissive coating 15 upon he photo-conducting film 14. These A-radiaions increase the conductivity of the film 14 but lo not affect the layer 15. A beam of radiations rom the moving spot of light produced by the luorescent screen 22 is directed by the lens sysem 21 through the interstices of the mesh elecrode 12 to scan successively the elemental areas f the photo-emissive coating 15. These radiaions are of the second, or B-type, and cause the oating 15 to be activated to cause the flow of a noving beam of photo-electrons to the mesh elecrode 12; the flow from any elemental area being ontrolled by the conductivity imparted to the orresponding elemental area of the photo-conucting film 14 by the radiations reflected by the bject O. In other words, the resistance of the ircuit through the tube at any instant is dependnt upon the resistance of the elemental area of he photo-conducting film 14 which corresponds o the elemental area of the photo-emissive coating 15 being scanned at that time. The resistance of the elemental areas of the film 14 is determined by the intensity of the radiations reflected from the object O onto the successive elemental areas of the film. Thus, an image current varying with the tone values of successive elemental areas of the image O is caused to flow through the external circuit including a resistance 17, as described above, where it is supplied; after amplification by the device 18, to a transmission circuit and over a line L, or a line carrier or radio channel, to a distant receiving station which includes a receiver R.

Receiver R may include an amplifier, in case the image current is directly transmitted, or a demodulator and amplifier in case transmission is effected in accordance with line carrier or radio practice. It may also include a cathode ray discharge device 30 comprising a cathode 31 and an anode 32 for producing the cathode beam, two pairs of plates 33 and 34 for respectively effecting deflection of the beam in two directions at right-angles to each other, a fluorescent screen 35, and a pair of control grids 36 and 37 connected by an external circuit 38 to which the image currents received over line L and amplified by the device 39 are supplied by means of a transformer 40. Auxiliary devices 41, 42 and 43, similar to those described in connection with the transmitter, are also used in the receiving system R. Devices 41 and 42 operate, as disclosed in the Knoop patent, to supply deflecting current of saw-tooth wave form to respective pairs of deflecting plates 34 and 33. The apparatus for producing the deflecting current is controlled by current of line scanning frequency received from the oscillator 24 via a transmission line or radio channel, which has not been shown, but its feeders have been designated as L' and L''. In this manner, the cathode beam of the receiver R is deflected in synchronism and in phase with the deflection of the cathode ray beam of the discharge device C used at the transmitter.

The cathode ray discharge device 30 at the receiving station operates in the following manner:

The control electrodes or grids 36 and 37 are closely adjacent each other in a position between the anode 32 and the fluorescent screen 35 and comprise segments of a sphere, the centers of which are close to the centers of the deflecting fields produced by the pairs of plates 33 and 34. The grid 36 is maintained at substantially the same potential as the anode 32 and the signal potentials are applied to the grid 37, which may be negatively polarized with respect to the grid 36. The two grids, therefore, serve to define a very limited zone in which the signal potentials are effective for controlling the cathode beam, and this zone is substantially isolated from the equipotential section established between the anode 32 and the grid 36, within which zone deflection of the beam is effective. Consequently, deflection of the beam is controlled by the fields established between the pairs of plates 33 and 34 without being influenced by the signal potentials, and the signal potentials operate to control the velocity or number of electrons constituting the beam and hence the intensity of the excitation of the fluorescent screen, which determines the quality of the image produced, without causing the direction of travel of the electrons to be varied. In other words, the two sets of elements for effectively controlling the deflection and intensity of the beam, each of which tends to interfere with the other and thereby cause loss of focus of the beam and distortion of the image, are so positioned and electrically controlled as to materially, if not completely, avoid such interference. For a more complete disclosure of the construction and method of operation of the image producing cathode ray device 30 briefly described above, reference may be made to application Serial No. 466,067 of J. B. Johnson, filed July 7, 1930.

While a receiver of the cathode ray discharge type has been described, it will, of course, be obvious that a glow lamp cooperating with a revolving disc having a spiral of apertures, or any other well-known receiver may be used with my invention. A satisfactory receiver of the glow lamp type is disclosed in United States Patent 1,728,122, September 10, 1929, to Horton.

The A-radiations may be red or infra-red, or in other words, those radiations having a wave-length greater than about 6500 Angstrom units, while the B-radiations may be blue, violet, or ultra-violet, or in other words, those radiations having a wave-length less than about 4700 Angstrom units. The wave-lengths given above are merely by way of example and this invention is not specifically limited thereto. While in Fig. 1 a system has been described in which the object has applied thereto A-radiations while the scanning beam is of B-radiations, it is to be understood that B-radiations may be used to reflect an image of the object onto the photo-emissive coating 15, whereby it is actuated to cause the emission of electrons, these B-radiations not affecting the conductivity of the photo-conducting film 14; and the film 14 may be scanned with a beam of A-radiations which affects its conductivity but which does not cause electronic emission from the layer 15. The scanning beam in this arrangement renders the elemental areas of the film 14 successively conductive as they are scanned in turn.

The cathode ray tube is well suited for use as a source for supplying a scanning beam of B-radiations as the spot of light given off by the fluorescent screen is rich in radiations in the blue, violet and ultra-violet portions of the spectrum. If ultra-violet radiations are used for the scanning beam, the lens in the optical system 21 as well as the material of the enclosure should be of a suitable substance to pass the radiations such as, for example, quartz. Also, it might be desirable in some cases to include within the optical system represented by 21 a suitable optical filter to filter out all undesired radiations.

The assembly shown in Fig. 2 may comprise a film 14 of selenium or other suitable material made of discrete particles so that the lateral conductivity is negligibly small. The film may be in globular form. Selenium is particularly sensitive to red and infra-red radiations. The very thin, and hence, discontinuous transparent, photoemissive coating 15 may be made of a suitable alkali metal sensitive to blue, violet, or ultra-violet radiations, such as for example, potassium hydride. The film 14 may comprise a thin, continuous film which may have its lateral conductivity decreased by cross-hatching the film with fine lines through to the metal plate 13, or the surface of the metal plate may be cross-hatched with numerous, deep, and narrow grooves.

The operation described above may be called the "resistance" method. If the thin film 14 is of sufficiently high specific resistance, the device will operate by another method, that is, by the so-called "storage" method because charges are laid down on one surface of the photo-conducting element which leak off during the next image cycle, the recharging current thus forming a greatly increased image current. This high specific resistance also makes possible the use of a continuous film of photo-conducting material while still restraining the lateral conductivity to a negligible minimum, provided that the thickness of the film is small compared to the diameter of the scanning spot, that is, for example, one-tenth of that diameter. For a more complete description of the "storage" method of operation in comparison with the "resistance" method, and the relation of lateral to transverse conductivity in thin high resistance films reference may be made to application Serial No. 67,058, filed March 4, 1936, for Frank Gray. A suitable photo-conducting material which is of sufficiently high specific resistance to operate in accordance with the storage method and which is sensitive to red or infra-red radiations is mercuric iodide ($HgI_2$).

An enlarged perspective view of a modified scanning tube is shown in Fig. 3. In this embodiment there is no mesh electrode, the external circuit being connected between the metal plate and a light transmitting conducting layer on the target. The composite target 47 comprises a metal plate 13 carrying two photo-conducting films 44 and 45 of different materials and a transparent conducting layer 46. The conductivity of the photo-conducting film 44 is changed by B-radiations, but is not affected by A-radiations. In the case of the photo-conducting film 45, the reverse is true as its conductivity is changed by A-radiations, but is unaffected by B-radiations. A-radiations reflected by the object are projected through the conducting layer 46 onto the first film 45 and a beam of B-radiations passes through the conducting layer and the first film to scan the second film 44, whereby a moving conductive path is provided between the conducting layer 46 and the metal plate 13, the external circuit is completed, and an image current, controlled by the variations of conductivity successively imparted to small areas of the first film by A-radiations, flows through the external circuit. If the second film 44 is made very thin and of high specific resistance when dark (that is, when not illuminated with the radiations to which it is sensitive), there is provided between the first film 45 and the metal plate 13 a capacity in which image impulses, corresponding to the elemental areas of the image, may be stored and hence a greatly increased image current flow is produced in the external circuit, which circuit is similar to that shown in Fig. 1. If the A-radiations are red or infra-red, the photo-conducting film 45 may be selenium for the "resistance" method or mercury iodide for the "storage" method and a photo-conducting film 44, sensitive to B-radiations (blue, violet, or ultra-violet), may consist of thallium bromide or chloride which may be used for either method as the specific resistance of the film 44 when illuminated does not have to be as high as that of the film 45 as this film 44 is used to discharge the stored charge rather than to store it up.

Fig. 4 shows a scanning tube S', which is adapted to be used in cases where the image is projected from a position in front of the target and a scanning beam is applied from a position behind the target. Referring more particularly to Fig. 5, which is an enlarged perspective view of the assembly within the tube S', this tube comprises an evacuated container in which is mounted a composite target 50, comprising a transparent supporting plate 51 of glass or similar material coated with a transparent metal layer 52 of a suitable substance such as silver, films 44 and 45, and a transparent conducting layer 46. The films and the conducting layer are similar to those described above with reference to Fig. 3. The external circuit is connected between the transparent metal layer 52 and the conducting layer 46 by a connection not shown in the drawings. The scanning beam is produced by the fluorescent screen of the cathode ray tube C, this and the optical systems 19 and 21 being also similar to those disclosed in connection with Fig. 1. Image controlled radiations are projected through the transparent conducting layer 46 onto the photo-conducting film 45 to control its conductivity in accordance with the tone values of the object. The scanning beam B from the fluorescent screen of the cathode ray tube C passes through the transparent plate 51 and the transparent conducting layer 52 to scan successively the elemental areas of the photo-conducting film 44 to impart conductivity to these elemental areas in succession. An image current is, therefore, produced which flows through the external circuit in a manner similar to that described above. This arrangement will also operate in accordance with the "storage" method described above.

Figs. 6, 7 and 8 each includes a target, similar to that disclosed with reference to Fig. 5 except for the differences noted below in the description of each figure, mounted on the external surface of the end wall 60 of the scanning cathode ray tube C.

In Fig. 6, the end wall 60 takes the place of the glass plate 51 of Fig. 5, but the target is otherwise similar. It comprises a transparent metal layer 52, preferably of silver, two photo-conducting films 44 and 45 of different materials, respectively similar to the photo-conducting films described in connection with Fig. 3, and a conducting layer 46 of silver or the like. While the glass enclosure 61 for the target is shown attached to the end wall of the cathode ray tube C, it may be spaced therefrom and have the target mounted in a position intermediate the walls of the container 61. This construction would include a glass plate similar to 51 of Fig. 5. The operation of the device shown in this figure is similar to that described above with reference to Fig. 4.

In Fig. 7, the two photo-conducting films are made of the same material and are separated by a medium to prevent radiations applied to one film from affecting the other film. The target thus comprises a transparent metallic layer 52, photo-conducting films 54 and 55, a thin, black, high resistance layer 56, made of bakelite or similar material, placed between the two photo-conducting films to prevent radiations applied to the film 55 from affecting film 54, and vice versa, and a conducting layer 46. With this construction, the same type of radiations may be used to both illuminate the image field and to scan the target. The method (or methods) of operation is similar to that of Fig. 6. The resistance layer 56 is so thin and of such high specific resistance that its lateral conductivity is small with respect to its transverse conductivity.

Fig. 8 shows a target in which a single film 62 mounted between the conducting layers 52 and 46 and is just thick enough to prevent both the scanning beam and the radiations applied to the image field from affecting it throughout. This arrangement permits the use of the same type of radiations for both illuminating the field and scanning the target. The film 62, as well as the films 54 and 55 of Fig. 7, may be made of the same material as either film 44 or 45 of Fig. 3, depending on the type of radiations it is desired to use. The operation of the device shown in this figure is similar to that described above in connection with Fig. 7, the single thick film 62 of this figure performing the functions of both films 54 and 55 of Fig. 7. In this figure, as well as in Fig. 7, the glass enclosure 61 has been omitted but it is preferable to have such an enclosure to protect the thin layers or films comprising the target.

In Figs. 6 to 8, inclusive, an optical system 19, similar to that shown in Fig. 1, may be used for projecting radiations from the image O on the target. It would also be satisfactory to use the same type of external circuit as used in that figure.

While this invention has been shown as applied to the situation where the object is a human being, it will be apparent that the invention is also applicable to the transmission of outdoor scenes or motion picture films, either using radiations reflected from the film, or passing through it, to control the operation of the scanning screen or target.

While several specific embodiments for utilizing the invention have been disclosed, it is to be understood that this invention is not limited thereto, but only by the scope of the appended claims. In these claims, the term "sensitive to radiations" as used to describe certain elements intended to include both photo-conducting and photo-emissive materials.

What is claimed is:

1. An electro-optical system comprising a thin plate-like photoelectric member appreciably sensitive only to radiations of a certain wave-length range, a second thin plate-like photoelectric member appreciably sensitive only to radiations of a different wave-length range, said first member being at least partially transparent to radiations within said second range, said photoelectric members being contiguous to each other, means for impressing radiations of both said ranges simultaneously on both said members from the side on which said first member is located, said means comprising means for projecting an image on an object field on said members with radiations of one of said ranges, and means for scanning said members element by element with radiations of the other of said ranges, a conductive element adjacent the first photoelectric member, a source of potential, and means including an impedance element for completing a circuit from said conductive element through said source of potential to all portions of said second photoelectric member, whereby radiations of one of said ranges act on one only of said photoelectric members to condition the system and radiations of the other of said ranges act on the other only of said photoelectric members to cause the formation of a signal current in said impedance element.

2. An electro-optical system comprising a thin plate-like photoelectric member appreciably sensitive only to radiations of a certain wave-length range, a second thin plate-like photoelectric member appreciably sensitive only to radiations of a different wave-length range, said first member being at least partially transparent to radiations within said second range, said photoelectric members being contiguous to each other and at least one of said members being photoconducting, means for impressing radiations of both said ranges simultaneously on both said members from the side on which said first member is located, said means comprising means for projecting an image of an object field on said members with radiations of one of said ranges, and means for scanning said members element by element with radiations of the other of said ranges, a conductive element adjacent the first photoelectric member, a source of potential, and means including an impedance element for completing a circuit from said conductive element through said source of potential to all portions of said second photoelectric member, whereby radiations of one of said ranges act on one only of said photoelectric members to condition the system and radiations of the other of said ranges act on the other only of said photoelectric members to cause the formation of a signal current in said impedance element.

3. In combination, a thin plate-like photo-emissive member appreciably sensitive only to radiations of a certain wave-length range, a thin plate-like photoconducting member contiguous to said photo-emissive member and appreciably sensitive only to radiations of a different wave-length range, said photo-emissive member being at least partially transparent to radiations within said second range, means for impressing radiations of both said ranges simultaneously on both of said members from the side on which said photo-emissive member is located, said means comprising means for projecting an image of an object field on said members with radiations of one of said ranges, and means for scanning said members element by element with radiations of the other of said ranges, a conductive element spaced from said photo-emissive member, a source of potential, and means for completing a circuit from said conductive element through said source of potential to all of the elements of said photoconducting member, whereby radiations of one of said ranges causes the emission of electrons from said photo-emissive layer to said conductive element and radiations of the other of said ranges changes the conductivity of each element of said photoconducting member in accordance with the intensity of said radiations on said elements.

4. An electro-optical system comprising a first thin plate-like photoconducting member appreciably sensitive only to radiations of a certain wave-length range, a second thin plate-like photoconducting member contiguous to said first photoconducting member and appreciably sensitive only to radiations of a different wave-length range, said first member being at least partially transparent to radiations within said second range, means for impressing radiations of both said ranges simultaneously on both said members from the side on which said first member is located, said means comprising means for projecting an image of an object field on said members with radiations of one of said ranges, and means for scanning said members element by element with radiations of the other of said ranges, a conductive element adjacent the first photoconducting member, a source of potential, and means including an impedance element for completing a circuit from said conductive element through said source of potential to all the elements of said second photoconducting member, whereby radiations of one of said ranges changes the conductivity of all the elemental areas of one of said photoconducting members and radiations of the other of said ranges makes various elements of the second photoconducting member appreciably conducting in turn so that a signal current passes through said impedance element.

FRANK GRAY.